US007519263B2

(12) United States Patent
Richards

(10) Patent No.: US 7,519,263 B2
(45) Date of Patent: Apr. 14, 2009

(54) LIGHT-EMITTING FUNNELING APPARATUS

(76) Inventor: James Richards, 5337 Avenida Almendros, San Jose, CA (US) 95123

(*) Notice: Subject to any disclaimer, the term of this patent is extended or adjusted under 35 U.S.C. 154(b) by 0 days.

(21) Appl. No.: 11/804,512

(22) Filed: May 18, 2007

(65) Prior Publication Data

US 2007/0297724 A1 Dec. 27, 2007

Related U.S. Application Data

(60) Provisional application No. 60/811,728, filed on Jun. 8, 2006.

(51) Int. Cl.
*G02B 6/00* (2006.01)

(52) U.S. Cl. .................................................... 385/147

(58) Field of Classification Search ...................... None
See application file for complete search history.

(56) References Cited

U.S. PATENT DOCUMENTS

| | | | | | |
|---|---|---|---|---|---|
| 1,181,261 | A | * | 5/1916 | Schmidt | 362/96 |
| 2,547,450 | A | * | 4/1951 | Du Pont | 222/113 |
| 2,577,857 | A | * | 12/1951 | Parisotto | 222/113 |
| 4,515,295 | A | * | 5/1985 | Dougherty | 222/113 |
| 4,788,789 | A | | 12/1988 | Boobar et al. | 43/113 |
| 5,138,301 | A | * | 8/1992 | Delahaye | 340/607 |
| 5,410,839 | A | | 5/1995 | Granger | 47/40.5 |
| 5,558,653 | A | * | 9/1996 | Lindstrom | 604/295 |
| 6,758,308 | B1 | | 7/2004 | Hearting et al. | 184/105.1 |
| 2004/0127771 | A1 | * | 7/2004 | Heine et al. | 600/200 |
| 2006/0237478 | A1 | * | 10/2006 | LaBuzetta | 222/113 |

* cited by examiner

*Primary Examiner*—Sung H Pak

(57) ABSTRACT

A light-emitting funneling apparatus comprises a conduit with a pouring end and a discharge end, wherein the pouring end is wider than the discharge end. The light-emitting funneling apparatus also comprises one or more light sources positioned adjacent to a portion of the conduit and configured to illuminate in a direction of a flow of material through the conduit. In some embodiments, the one or more light sources are external to the conduit. Alternatively, the one or more light sources are internal to the conduit. The light-emitting funneling apparatus further comprises a means for selectively activating the light source. In some embodiments, the funnel comprises a battery for powering the one or more light sources.

20 Claims, 6 Drawing Sheets

LIGHT-EMITTING FUNNELING APPARATUS

CROSS REFERENCE TO RELATED APPLICATIONS

The application claims priority of U.S. provisional application, Ser. No. 60/811,728, filed Jun. 8, 2006, and entitled "Light-Emitting Funnel Apparatus for Liquid and the Like," by this same inventor. This application incorporates U.S. provisional application, Ser. No. 60/811,728 in its entirety by reference.

FIELD OF THE INVENTION

The present invention relates to funnels. More particularly, the present invention relates to the light-emitting funneling apparatus.

BACKGROUND OF THE INVENTION

Funnels are used to channel liquid or fine-grained substances from one container to a receiving container with a opening. Without a funnel, spillage can occur, especially when funneling a substance into a small opening. However, prior art funnels suffer from a number of shortcomings. For example, in limited lighting conditions or at night, it can be difficult to determine where the opening is on the receiving container in order to use a prior art funnel. It can also be difficult to determine whether too much substance has already been funneled into the receiving container before the substance overflows.

The present invention addresses these limitations in the prior art.

SUMMARY OF THE INVENTION

An objective of the present invention is to provide a light-emitting funneling apparatus that is capable of withstanding a variety of substances while emitting light. The light provides guidance to a user in finding an opening of a receiving container and helps the user determine how much substance has already been funneled into the receiving container, thereby reducing the chance of spilling substances.

In one aspect of the invention, a funnel preferably has a conduit with a pouring end and a discharge end. Typically, the pouring end is wider than the discharge end. Preferably, the funnel also has one or more light sources positioned adjacent to a portion of the conduit. In some embodiments, the one or more light sources are external to the conduit. Alternatively, the one or more light sources are internal to the conduit. Typically, the one or more light sources illuminate in a direction of a flow of material through the conduit.

In some embodiments, the funnel also has a battery for powering the one or more light sources. Preferably, the funnel has a means for selectively activating the one or more light sources.

In another aspect of the invention, a lighted funnel assembly preferably has a funnel with a body and a stem, a battery chamber that is positioned adjacent to the funnel, and one or more light sources that are positioned adjacent to a portion of the funnel. Typically, the one or more light sources illuminate in a direction of a flow through the funnel. In some embodiments, the one or more light sources are LED. In some embodiments, the one or more light sources are coupled to the battery chamber. Alternatively, the one or more light sources are coupled to the battery chamber by one or more wiring channels. The one or more wiring channels extend from one or more openings in the battery chamber, mounted down a side of the body, and contain wires to couple the battery to the one or more light sources.

In addition, the lighted funnel assembly preferably has a switch that is positioned adjacent to the funnel and selectively activates the one or more light sources. In some embodiments, the lighted funnel assembly has a battery for powering the one or more light sources. Typically, the battery is positioned within the battery chamber.

In some embodiments, the lighted funnel assembly also has a flexible tubular member. The flexible tubular member is detachably coupled to the stem. Preferably, the flexible tubular member transmits, reflects and refracts light.

Yet in another aspect, a light-emitting funneling apparatus has a cone with a longitudinal axis, an inlet and an outlet. Typically, the inlet is wider than the outlet. Typically, the longitudinal axis extends from the inlet to the outlet. In some embodiments, the light-emitting funneling apparatus has a neck that is detachably coupled to the outlet.

Preferably, the light-emitting funneling apparatus has a battery chamber with a top ledge. Typically, the top ledge is outwardly curved and is used for coupling the battery chamber to a portion of the cone. In addition, the light-emitting funneling apparatus preferably has one or more wiring channels that extend from one or more openings in the battery chamber, mounted down a side of the cone, and end at a portion of the outlet where the light source is mounted. In some embodiments, the one or more wiring channels reside within the cone. Alternatively, the one or more wiring channels reside on a surface of the cone.

In some embodiments, the one or more wiring channels fork into two channels: a first forked channel ends at the portion of the outlet and a second forked channel continues along the outlet ending at an opposite side of the first forked channel.

Preferably, the light-emitting funneling apparatus also has one or more sockets. Typically, the one or more sockets protrude from the portion of the outlet parallel to the longitudinal axis. Typically, the neck encloses the one or more sockets.

Preferably, the light-emitting funneling apparatus further has one or more light sources that are positioned within the one or more sockets. Typically, the one or more light sources illuminate in a direction of a flowing substance. In some embodiments, the one or more light sources are LED.

In addition, the light-emitting funneling apparatus preferably has a switch that is positioned adjacent to the cone and selectively activates the one or more light sources. Typically, the light-emitting funneling apparatus has a battery that powers the one or more light sources. The battery is typically positioned within the battery chamber. In some embodiments, the battery chamber has a cap for accessing the battery.

In some embodiments, the light-emitting funneling apparatus further has an elongated flexible hose that is detachably coupled to the neck. Preferably, the elongated flexible hose transmits and refracts light.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Figure 1A:
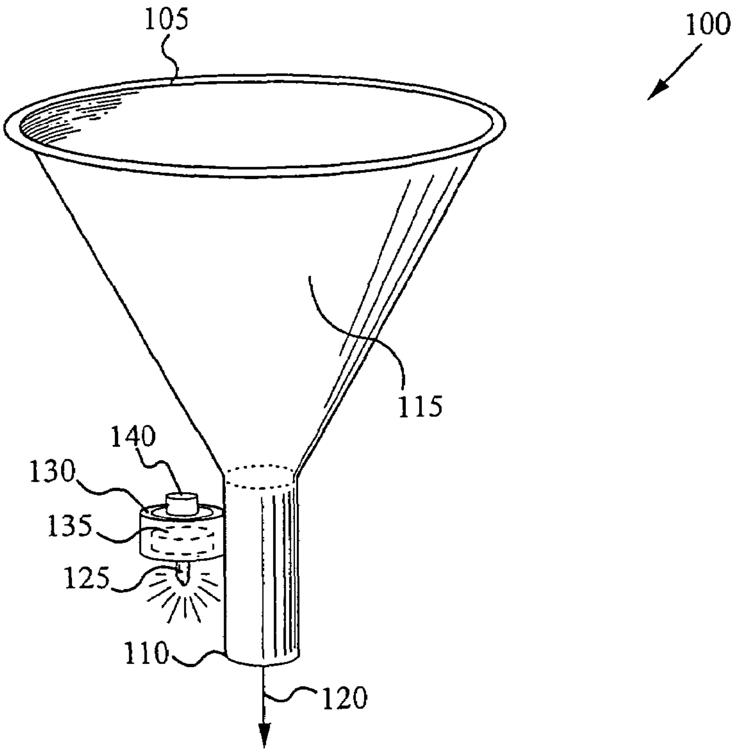
FIG. 1A illustrates an isometric side view of a first embodiment of the present invention and its various components.

The present invention is directed toward a funnel that emits light. In one aspect of the invention, as shown in FIG. 1A, a funnel 100 preferably has a conduit 115 with a pouring end 105 and a discharge end 110. Typically, the pouring end 105 is wider than the discharge end 110. Preferably, the funnel 100 is capable of withstanding a variety of substances.

The funnel 100 preferably has one or more light sources 125 that illuminate in a direction of a flow of material, as indicated by an arrow 120, through the conduit 115. In some embodiments, the one or more light sources 125 are LED. Typically, the one or more light sources 125 provide a solitary or blinking light. In some embodiments, the one or more light sources 125 provide a wide-angled light. A light color of the one or more light sources 120 can be any shades of white, red, yellow, orange, blue, purple, pink, or ultra-violet.

In some embodiments, the funnel 100 has a battery 135 for powering the one or more light sources 125. The battery 135 is preferably one of alkaline based, lithium based, or silver-oxide based. In addition, the battery 115 can be any convenient size, volt, ampere, and watt value.

The funnel 100 preferably has a means for selectively activating the one or more light sources 125. In one embodiment of the present invention, a slide or press switch 140 is used to selectively activate the one or more light sources 125. Various other means for selectively activating the one or more light sources 125 include but are not limited to using a button and twist device. In another embodiment of the present invention, the one or more light sources 125 are activated by shaking the funnel 100.

Figure 1B:
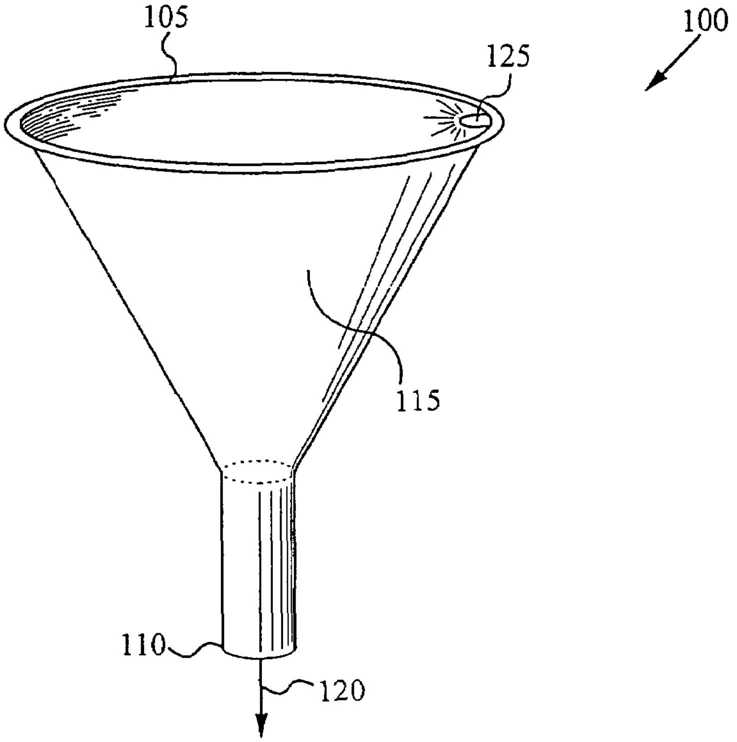
FIG. 1B illustrates an isometric side view of a second embodiment of the present invention.

Preferably, the one or more light sources 125 are positioned adjacent to a portion of the conduit 115. In some embodiments, the portion of the conduit is external. As illustrated in FIG. 1A, the one or more light sources 125 are located on an external surface of the conduit 115 near the discharge end 110. Alternatively, the portion of the conduit is internal. As illustrated in FIG. 1B, the one or more light sources 125 are located on an internal surface of the conduit 115 near the pouring end 105. It will be apparent to those of ordinary skill in the art that a variety of locations the one or more light sources 125 are positioned on the conduit 115 could be employed while remaining within the spirit and scope of the present invention.

Figure 2:
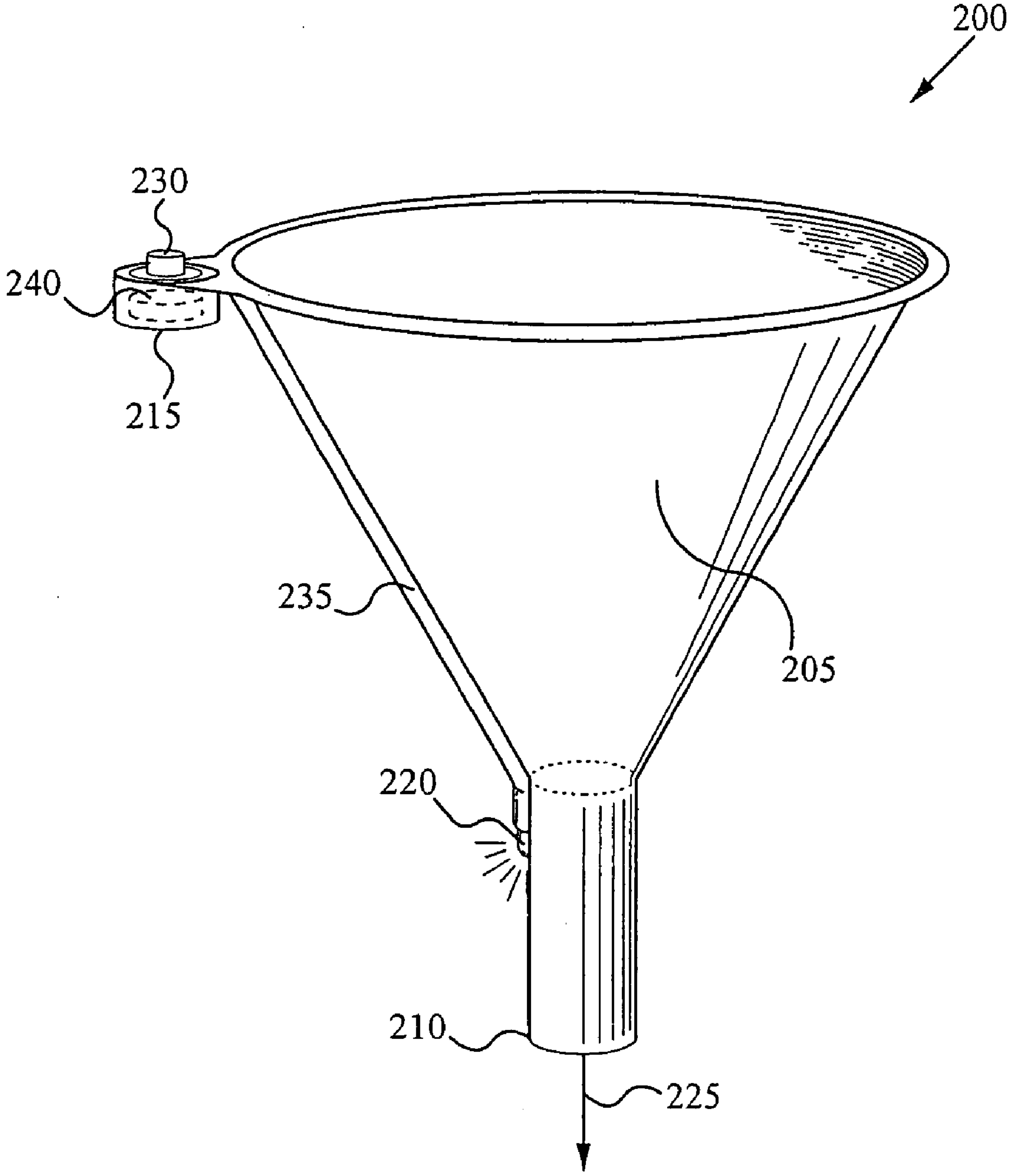
FIG. 2 illustrates an isometric side view of a third embodiment of the present invention and its various components.

FIG. 2 illustrates another aspect of the invention. Preferably, a lighted funnel assembly 200 has a body 205 and a stem 210. In some embodiments, the stem 210 is removable from the body 205. The lighted funnel assembly 200 preferably has a battery chamber 215 that is positioned adjacent to the funnel. The lighted funnel assembly 220 also has one or more light sources 220 that are positioned adjacent to a portion of the funnel. Typically, the one or more light sources illuminate in a direction of a flow as indicated by an arrow 225. In some embodiments, the one or more light sources are LED.

In some embodiments, referring back to FIG. 1A, the one or more light sources 125 are coupled to a battery chamber 130. The one or more light sources 125 coupled to the battery chamber 130 is positioned adjacent to the conduit 115, such as near the discharge end 110. Alternatively, now referring to FIG. 2, the one or more light sources 220 are coupled to the battery chamber 215 by one or more wiring channels 235. Typically, the one or more wiring channels 235 extend from one or more openings in the battery chamber 215, mounted down a side of the body 205, and couple a battery 240 to the one or more light sources 220.

In addition, the lighted funnel assembly 200 preferably has a switch 230 that is positioned adjacent to the funnel and selectively activates and deactivates the one or more light sources 220. In some embodiments, the switch 230 is located on the battery chamber 215 for easy access during use. In some embodiments, the lighted funnel assembly 200 has the battery 240 for powering the one or more light sources 220. Typically, the battery 240 is positioned within the battery chamber 215.

Figure 3A:
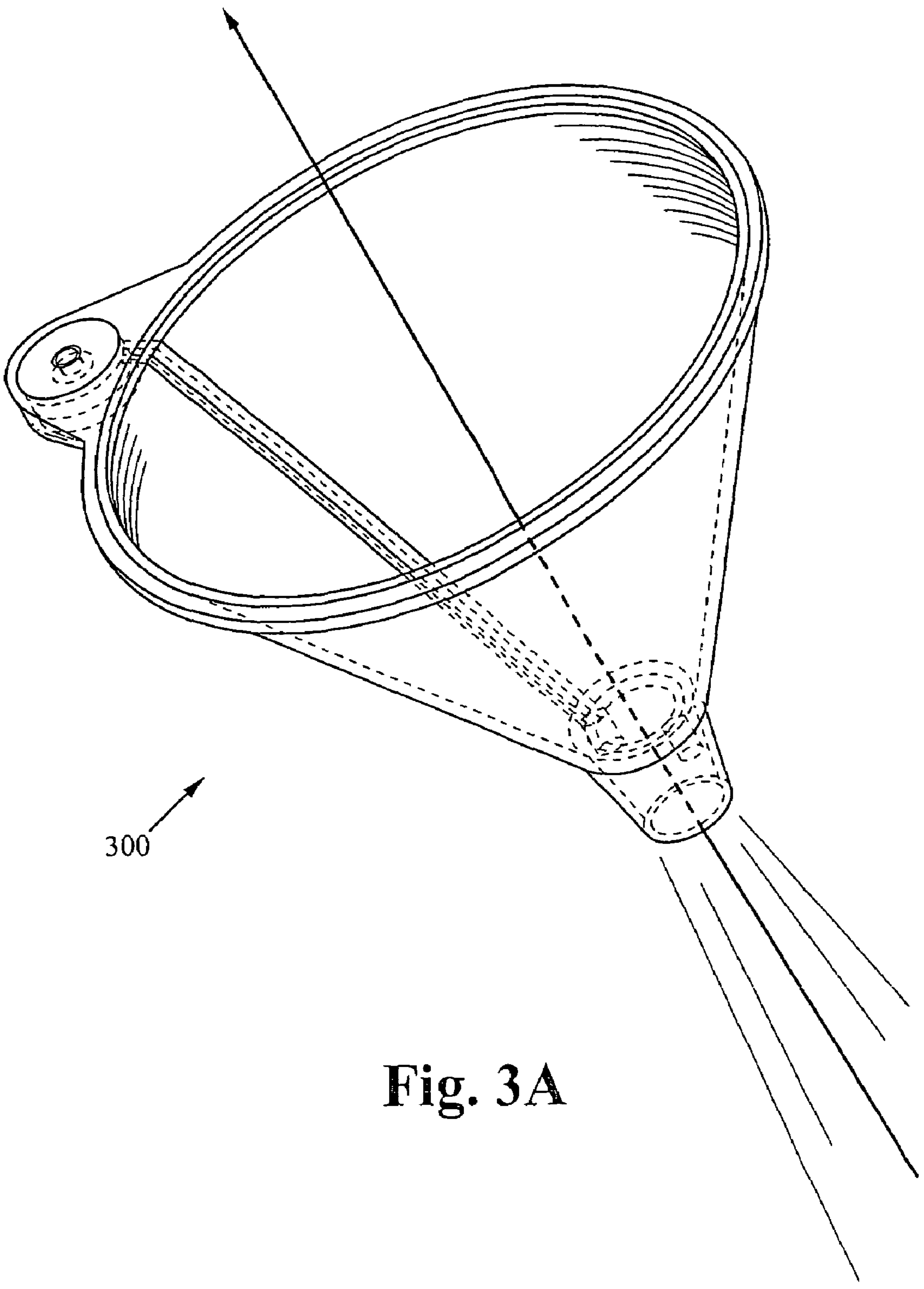
FIG. 3A illustrates a fourth embodiment of the present invention.
Figure 3B:
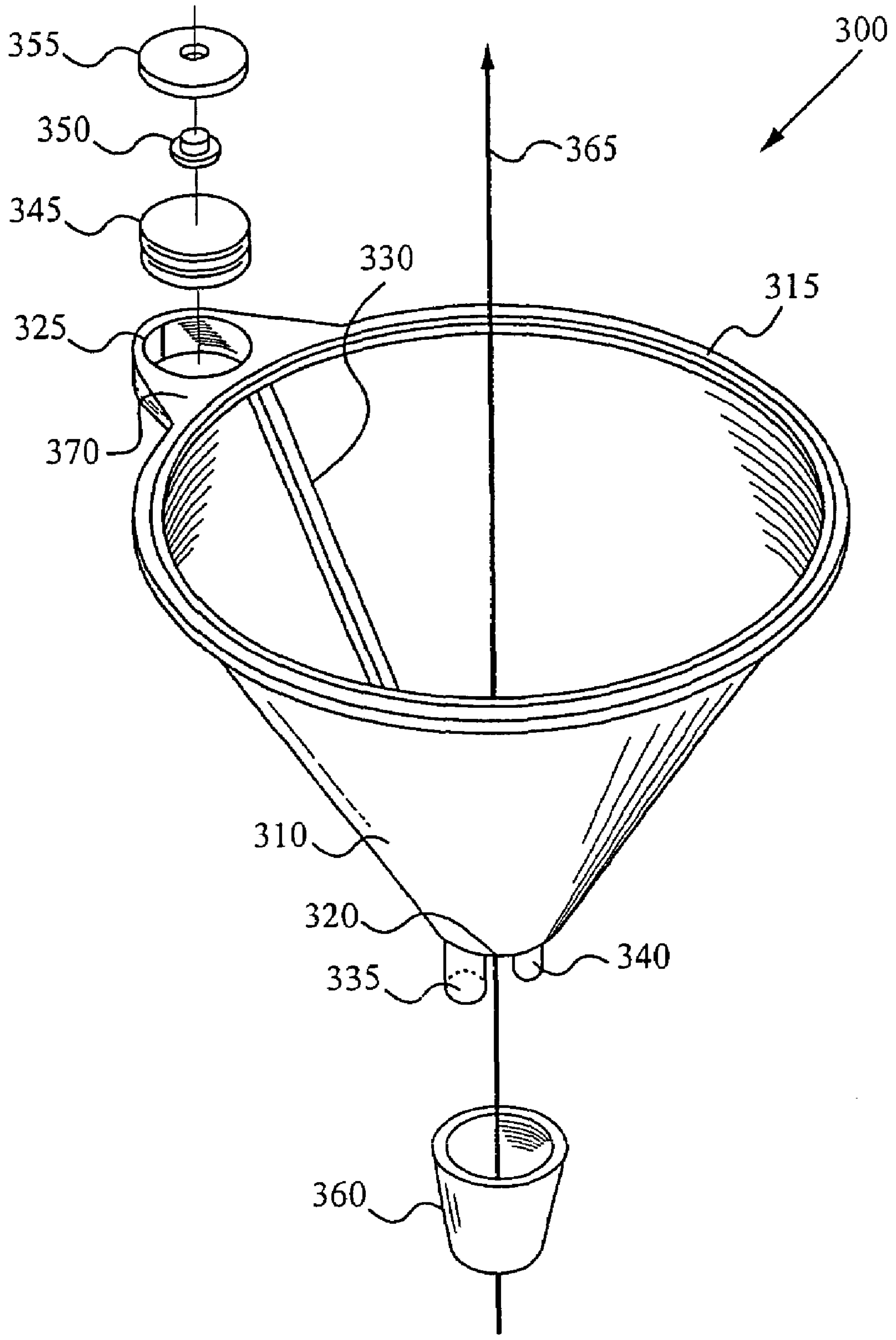
FIG. 3B illustrates an isometric side view of the fourth embodiment of the present invention and its various components.

FIGS. 3A-3D depict yet in another aspect of the present invention. While FIG. 3A illustrates a fourth embodiment of the present invention, FIG. 3B illustrates an isometric side view of the fourth embodiment of the present invention and its various components. Referring to FIG. 3B, the light-emitting funneling apparatus 300 has a cone 310 with an inlet 315 and an outlet 320. Typically, the inlet 315 is wider than the outlet 320. Typically, a longitudinal axis 365 extends from the inlet 315 to the outlet 320. In some embodiments, the light-emitting funneling apparatus 300 has a neck 360 that is detachably attached to the outlet 320. Both the cone 310 and the neck 360 of the present invention vary in size, length, dimension, and opening.

Preferably, the light-emitting funneling apparatus 300 has a battery chamber 325 with a top ledge 370. Typically, the top ledge 370 is outwardly curved and is used for coupling the battery chamber 325 to a portion of the cone 310, such as at the inlet 315. The battery chamber 325 can be used as a gripping mechanism for a user to hold on to while channeling liquid or fine-grained substances into a receiving container with a small opening.

Figure 3C:
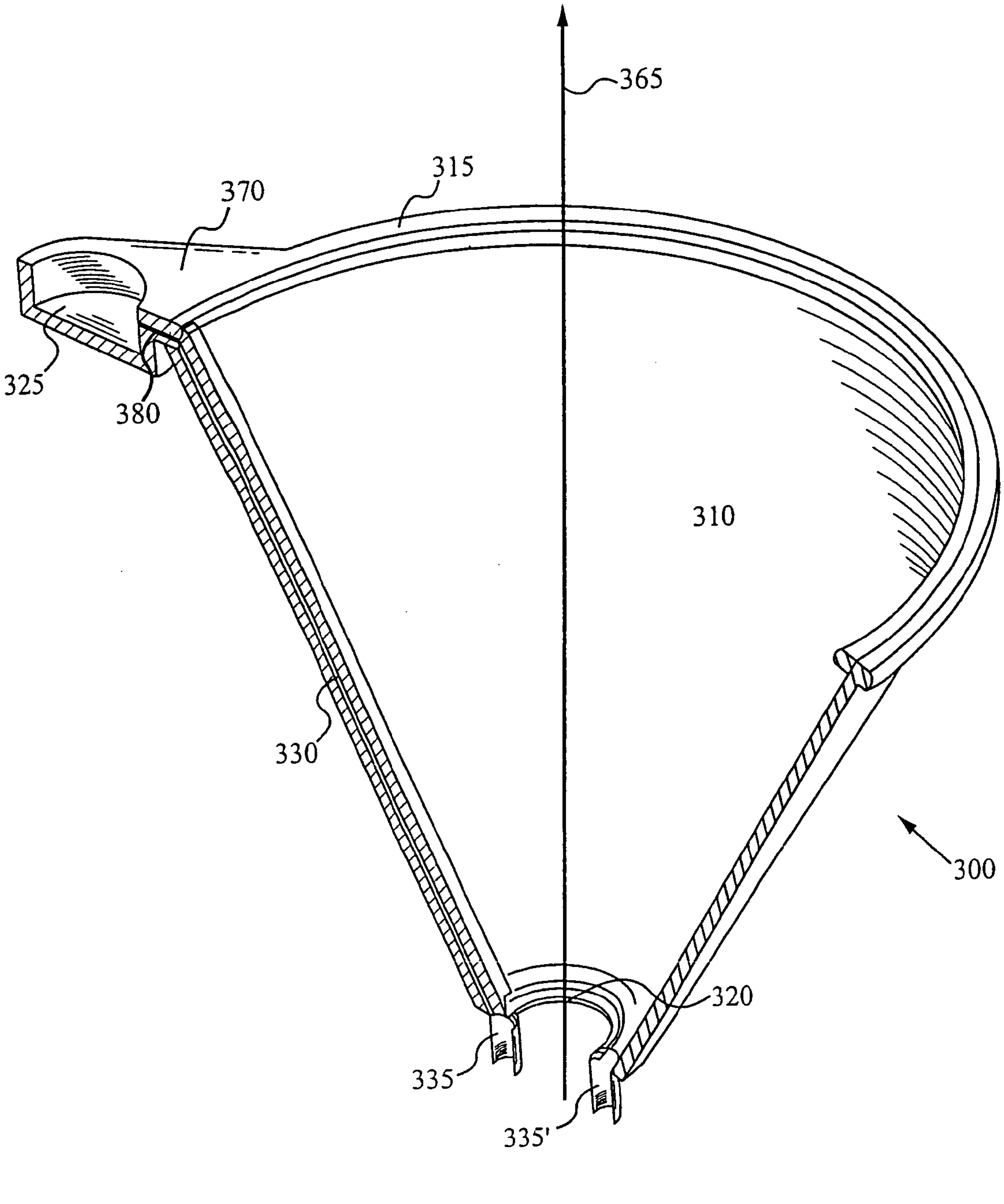
FIG. 3C illustrates an isometric cut-away view of the fourth embodiment of the present invention.

FIG. 3C illustrates an isometric cut-away view of the light-emitting funneling apparatus 300. The light-emitting funneling apparatus 300 has one or more wiring channels 330. The one or more wiring channels 330 extend from one or more openings 380 in the battery chamber 325, mounted down a side of the cone 310, and end at a portion of the outlet 320. Typically, the one or more wiring channel 330 houses electrical wires (not shown).

In some embodiments, the one or more wiring channels 330 reside within the cone 310, as shown in FIG. 3C. Accordingly, the one or more wiring channels 330 are seamlessly integrated with the cone 210.

Alternatively, as depicted in FIG. 2, the one or more wiring channels 235 reside on an exterior surface of the body 205.

Alternatively, the one or more wiring channels 235 reside on an interior surface of the body 205 (not shown).

Referring back to FIG. 3C, in some embodiments, the one or more wiring channels 330 fork into two wiring channels: a first forked wiring channel ends at the portion of the outlet 320 and a second forked wiring channel continues along the outlet 320 ending at an opposite side of the first forked wiring channel. It will be apparent to those of ordinary skill in the art that the one or more wiring channels do not necessarily need to fork at the outlet 320 and that other forks along the side of the cone 310 are possible. For instance, the one or more wiring channels 330 can fork near the inlet 315 (not shown) or at a middle of the cone 310 (not shown).

The light-emitting funneling apparatus 300 preferably has one or more sockets 335. The one or more sockets 335 protrude from the portion of the outlet 320 parallel to the longitudinal axis 365. In some embodiments, a second socket 335' protrudes from another portion of the outlet 320 parallel to the longitudinal axis 365. The second socket 335' is located where the second forked wiring channel ends. Referring back to FIGS. 3A and 3B, the neck 260 encloses the one or more sockets 235.

As depicted in FIG. 3B, the light-emitting funneling apparatus 300 further has one or more light sources 340. The one or more light sources 340 are positioned within the one or more sockets 335. Typically, the one or more light sources 340 illuminate in a direction of a flowing substance. In some embodiments, the one or more light sources 340 are LED.

As mentioned above, in some embodiments, the neck 360 is detachable from the outlet 320. Removing the neck 360 provides the user easy access to the one or more light sources 340 when the one or more light sources 340 need to be replaced.

The light-emitting funneling apparatus 300 preferably has a switch 350 positioned adjacent to the cone 310. The switch 350 is for selectively activating the one or more light sources 340. In some embodiments, the switch 350 is located on the battery chamber 355 for easy access during use.

Typically, the light-emitting funneling apparatus 300 has a battery 345 for powering the one or more light sources 340. Typically, the battery 345 is positioned within the battery chamber 325. In some embodiments, the battery chamber 325 further comprises a cap 355 for accessing the battery 345. Removing the cap 355 provides the user access to the battery 345 when the battery 345 needs to be replaced.

When the switch 350 of the light-emitting funneling apparatus 300 is powered on, the light travels down the neck 360 of the light-emitting funneling apparatus 300, thereby providing visibility to a work area. The light provides guidance to the user in finding an opening of a receiving container especially at night or in limited lighting conditions, consequently, reducing the chance of spilling substances. In addition, the light helps the user to determine whether too much substance has already been poured into the receiving container before the substance overflows.

Figure 3D:
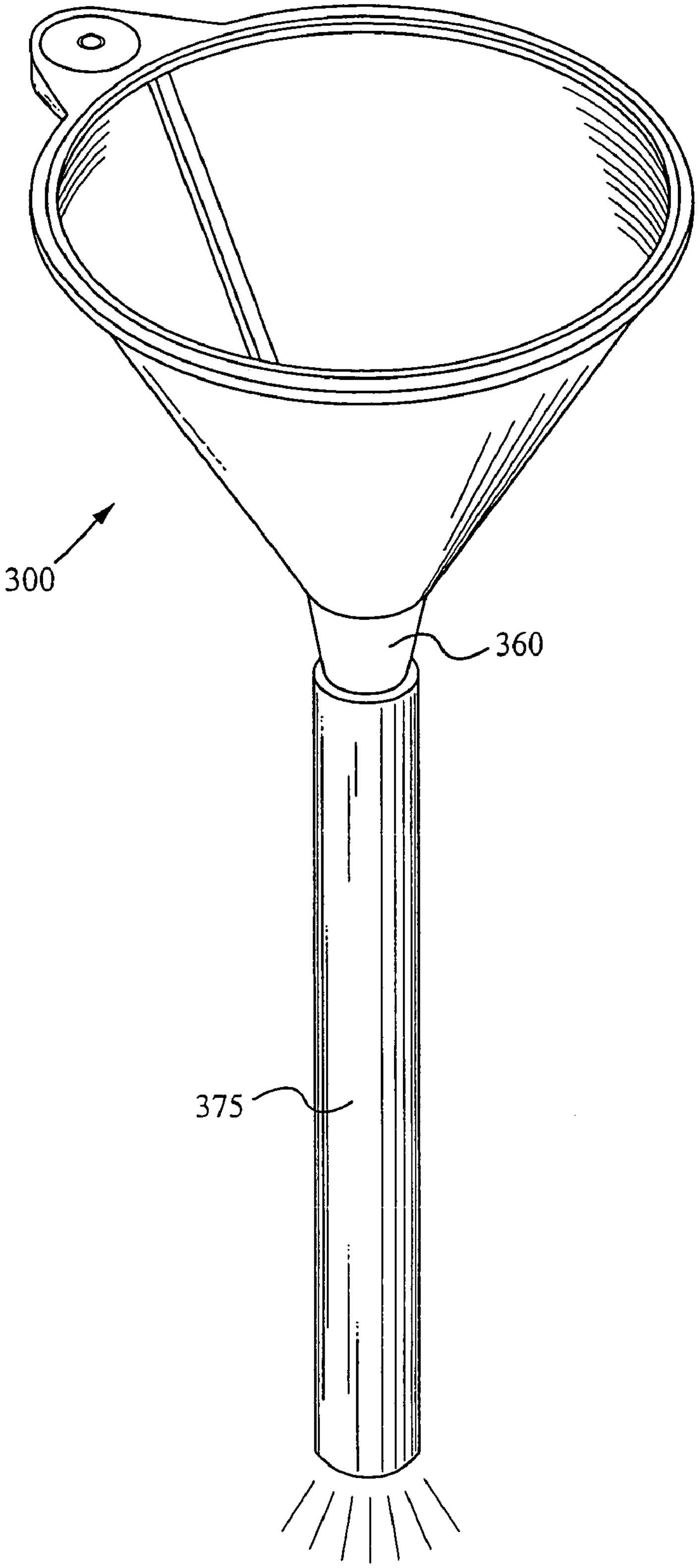
FIG. 3D illustrates an isometric side view of the fourth embodiment of the present invention with an attached elongated flexible hose.

In some embodiments, the light-emitting funneling apparatus 300 further has an elongated flexible hose 375, as illustrated in FIG. 3D. The elongated flexible hose 375 can be attached to and removed from the neck 360. The elongated flexible hose 375 is positionably manipulable to facilitate the channeling of liquid or fine-grained substances into the opening of the receiver container within a spatially-constrained work space. Preferably, the elongated flexible hose 375 is made from material capable of transmitting, reflecting and refracting light emitted from the one or more light source 340 and out from a bottom end of the elongated flexible hose 375. Typically, the elongated flexible hose 375 is made from crystalline materials, polymers, or plastic materials, which reflect, refract, or both, light.

The light transmitted out from the end of the elongated flexible hose 375 provides the user guidance in finding the opening of the receiver container under limited lighting conditions and spatially-constrained work places. Accordingly, the elongated flexible hose 375 minimizes undesirable leakage of the liquid or fine-grained substances.

The cone 310 and elongated flexible hose 375 can be used as a party novelty for drinking a beverage. The flexible hose 375 can be formed of a non-toxic transparent polymer and be colored to enhance the visual effect. Additionally, small objects such as flecks of metal foil can be formed within the wall of the flexible hose 375 to provide a pleasing display. The cone 310 can be mounted to a user's hat.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the light-emitting funneling apparatus will occur. Consequently, the claims should be broadly construed, consistent with the spirit and scope of the invention, and should not be limited to their exact, literal meaning.

I claim:

1. A funnel, comprising:

a. a conduit having a pouring end and a discharge end, wherein the pouring end is wider than the discharge end;

b. at least one light source configured to illuminate in a direction of a flow of material through the conduit;

c. a means for selectively activating the at least one light source;

d. at least one wiring channel, wherein the at least one wiring channel extends from the pouring end, mounted down a side of the conduit, and couples to the at least one light source; and e. at least one socket, wherein the at least one socket protrudes from a portion of the discharge end, the at least one light source is positioned within the at least one socket.

2. The funnel as recited in claim 1, further comprising a battery for powering the at least one light source.

3. The funnel as recited in claim 1, wherein the portion of the discharge end is external.

4. The funnel as recited in claim 1, wherein the portion of the discharge end is internal.

5. A lighted funnel assembly, comprising:

a. a funnel having a body and a stem;

b. a battery chamber, wherein the battery chamber is positioned adjacent to the funnel;

c. at least one light source, wherein the at least one light source is configured to illuminate in a direction of a flow;

d. a switch, wherein the switch is positioned adjacent to the funnel and selectively activates the at least one light source;

e. at least one wiring channel, wherein the at least one wiring channel extends from an at least one opening in the battery chamber and ends at the at least one light source; and f. at least one socket, wherein the at least one socket protrudes from a portion of the stem, the at least one light source is disposed within the at least one socket.

6. The lighted funnel assembly as recited in claim 5, wherein the at least one light source is LED.

7. The lighted funnel assembly as recited in claim 5, wherein the at least one wiring channel is mounted down a side of the body.

8. The lighted funnel assembly as recited in claim 5, wherein the at least one wiring channel couples a battery to the at least one light source.

9. The lighted funnel assembly as recited in claim 8, wherein the battery is configured for powering the at least one light source, the battery is positioned within the battery chamber.

10. The lighted funnel assembly as recited in claim 5, further comprising a flexible tubular member, wherein the flexible tubular member is detachably coupled to the stem, the flexible tubular member is configured to transmit, reflect and refract light.

11. A light-emitting funneling apparatus, comprising:

a. a cone having a longitudinal axis, an inlet and an outlet, wherein the inlet is wider than the outlet, the longitudinal axis extends from the inlet to the outlet;

b. a battery chamber comprising a top ledge, wherein the top ledge is outwardly curved and is configured for coupling the battery chamber to a portion of the cone;

c. at least one wiring channel, wherein the at least one wiring channel extends from an at least one opening in the battery chamber, mounted down a side of the cone, and ends at a portion of the outlet;

d. at least one socket, wherein the at least one socket protrudes from the portion of the outlet parallel to the longitudinal axis;

e. at least one light source, wherein the at least one light source is positioned within the at least one socket and configured to illuminate in a direction of a flowing substance; and f. a switch, wherein the switch is positioned adjacent to the cone and selectively activates the at least one light source.

12. The light-emitting funneling apparatus as recited in claim 11, wherein the battery chamber further comprises a cap.

13. The light-emitting funneling apparatus as recited in claim 11, wherein the at least one light source is LED.

14. The light-emitting funneling apparatus as recited in claim 11, wherein the at least one wiring channel resides within the cone.

15. The light-emitting funneling apparatus as recited in claim 11, wherein the at least one wiring channel resides on a surface of the cone.

16. The light-emitting funneling apparatus as recited in claim 11, wherein the at least one wiring channel forks into two channels, a first forked channel ending at the portion of the outlet, a second forked channel continues along the outlet ending at an opposite side of the first forked channel.

17. The light-emitting funneling apparatus as recited in claim 11, further comprising a battery, wherein the battery powers the at least one light source, the battery is positioned within the battery chamber.

18. The light-emitting funneling apparatus as recited in claim 11, further comprising a neck, wherein the neck detachably couples to the outlet and encloses the at least one socket.

19. The light-emitting funneling apparatus as recited in claim 18, further comprising an elongated flexible hose, wherein the elongated flexible hose is detachably coupled to the neck, the elongated flexible hose is configured to transmit, reflect and refract light.

20. The funnel as recited in claim 1, further comprising an adjustable tubular member configured transmit, reflect and refract light, wherein the adjustable tubular member is detachably coupled to the discharging end.

* * * * *